United States Patent [19]

Bolte et al.

[11] 3,912,550

[45] Oct. 14, 1975

[54] FLUX FOR SOFT SOLDERS

[75] Inventors: Hans-Eckhard Bolte; Klaus-Lothar Schubert, both of Wuppertal, Germany

[73] Assignee: Stannol-Lotmittelfabrik Wilhelm Paff, Wuppertal, Germany

[22] Filed: Aug. 7, 1973

[21] Appl. No.: 386,351

[30] Foreign Application Priority Data
Sept. 2, 1972 Germany.............................. 2243374

[52] U.S. Cl. ..................... 148/23; 29/495; 148/25; 260/583 G
[51] Int. Cl.² ........................................ B23K 35/362
[58] Field of Search ................... 148/23, 25, 24, 26; 117/52; 29/495, 496; 260/583 G, 29.2 N

[56] References Cited
UNITED STATES PATENTS

| | | | |
|---|---|---|---|
| 1,990,273 | 11/1933 | Dykstra................................. | 148/23 |
| 2,330,904 | 6/1942 | Miller ................................... | 148/23 |
| 3,000,769 | 9/1961 | Melchiors............................. | 148/23 |
| 3,675,307 | 7/1972 | Strauss et al...................... | 148/23 X |

FOREIGN PATENTS OR APPLICATIONS
1,194,682   5/1966   Germany

*Primary Examiner*—Allen B. Curtis
*Assistant Examiner*—Thomas A. Waltz
*Attorney, Agent, or Firm*—Donald D. Jeffery

[57] ABSTRACT

The invention relates to fluxes for soft solder based on a resin carrier and containing as activator a hydrohalic salt of a halogen-substituted aliphatic amine.

14 Claims, No Drawings

FLUX FOR SOFT SOLDERS

This invention relates to a flux for soft solders, more especially for soldering wires with a flux core.

BACKGROUND OF THE INVENTION

It is known that soldering with soft solder can be carried out with a flux by which the components to be soldered can be freed from impurities and, in particular, from oxidation products present on the metal surfaces to be soldered. This is necessary to obtain strong soldered joints. It is also necessary that, after soldering, the soldering flux should not have any adverse effects upon the soldered joint and/or adjacent areas. In particular, the soldering flux should not cause or accelerate any further corrosion of the metal surface after soldering. Soldering wires with a flux core have acquired considerable significance in soldering with soft solder. Conventional fluxes for soft solders generally contain a resin-based, preferably a rosin-based carrier substance and an activating agent based on hydrohalic acid salts of organic amines. Since fluxes containing hydrohalic acid salts of unsubstituted aliphatic amines have numerous disadvantages insofar as inter alia they have an unpleasant smell, are hygroscopic, sputter during soldering and can only be spread to a limited extent over the surface to be soldered, hydrohalic acid salts of N,N-disubstituted alkanolamines have been used as activating agents according to the prior art (German Pat. Specification No. 1,119,086). However, since these activating agents do not provide satisfactory results either, hydrohalic acid salts of organic amines whose nitrogen atom contains an electronegative group, preferably a para-substituted phenyl radical, as substituent and a group imparting solubility in the resin (preferably rosin) were subsequently used as activating agents (German Pat. Specification No. 1,194,682). However, these known fluxes are not altogether satisfactory either. In particular, the activator has to be added to the resin in a relatively large quantity. In general, the activator content of the flux is expressed as the hydrohalide content which is added in the form of the flux. According to the prior art, the hydrohalide content generally amounts to between 1.5 and 2.0 % of hydrochloride, based on the total flux. Despite this high activator content, conventional fluxes have only a limited degree of spread. The degree of spread of a flux is the surface area covered by a solder under certain soldering conditions.

SUMMARY OF THE INVENTION

The object of the present invention is to provide a flux for soft solders which, despite its low activator content, shows the favourable properties of conventional fluxes and, in particular, has a higher degree of spread. It has surprisingly been found that fluxes with these improved properties can be obtained providing the flux contains as activators amines of the kind containing an aliphatic radical with at least one halogen atom as at least one substituent.

Accordingly, the invention relates to a flux for soft solders, more especially for soldering wires with a flux core, with a resin-based, preferably rosin-based, carrier substance and an activating agent based on hydrohalic acid salts of organic amines, which is distinguished by the fact that it contains hydrohalic acid salts of organic amines corresponding to the general formula

in which $R_1$ represents an aliphatic radical with 1 to 6 carbon atoms containing at least one halogen atom, whilst $R_2$ and $R_3$, which can be the same or different, represent hydrogen or aliphatic radicals with 1 to 6 carbon atoms or have the same meaning as $R_1$.

It is surprising that, where amine salts of the kind defined above are worked into a flux, superior results are obtained by comparison with the prior art because, according to German Pat. Specification No. 1,194,682, the amines have to contain at least one strongly electronegative group and at least one other group imparting solubility to the resin in order to obtain the required properties, no mention being made of aliphatic groups containing halogen atoms as the electronegative groups. According to the invention, there is no need for the amines present in the flux as activator to contain a solubilising group as substituent, and the nitrogen atom can contain as its sole substituent an aliphatic group which only has to contain one halogen atom. Inspite of this, there is a high degree of compatibility between activator and resin, in other words the activator readily dissolves in the resin and satisfies all the other requirements which a flux containing an activator has to meet, the superior effects already referred to and discussed in more detail below being additionally obtained.

Fluxes containing hydrohalic acid salts of organic amines corresponding to formula I above in which the aliphatic groups contain 1 to 3 carbon atoms, are particularly preferred in accordance with the invention. Amines containing saturated aliphatic groups are the most readily available and, hence, are preferred. The aliphatic groups attached to the nitrogen atom can be linear or branched. This factor does not have any real significance so far as the technical effect obtained in accordance with the invention is concerned. For reasons of easy accessibility, compounds with linear alkyl radicals are preferred. This applies in particular as regards substituents which contain a halogen atom in accordance with the definition of the invention. Particularly preferred activators are primary amines, i.e., compounds of formula I above in which $R_2$ and $R_3$ represent hydrogen, because these compounds are the most readily accessible and, in addition, have the advantage of an extremely low molecular weight. Accordingly, it is possible to add these compounds to the flux in a smaller quantity by weight and, inspite of this, to obtain a marked effect in regard to the flux and solder.

The substituent $R_1$ can contain chlorine, bromine or fluorine as the halogen atom. Chlorine is particularly preferred for reasons of cost and ready accessibility. It is also preferred for the halogen atom to be attached to the end of the alkyl group because these compounds are also particularly readily accessible and have a favourable effect. The number of halogen atoms in the aliphatic radicals should be as low as possible because a single halogen atom is sufficient to provide an excellent soldering effect and, in cases where compounds containing several halogen atoms are used, the danger of corrosion is increased. Due in addition to the high atomic weight of halogens, an increased halogen content increases the molecular weight of the activator which is undesirable because the activator content of the flux, based on weight, is increased in this way although the effect of the activator remains the same. In view of the foregoing observations, 2-chloroethylamine hydrochloride has proved to be the simplest and most readily accessible compound for the purposes of the invention. It provides excellent results and, for this reason, was used in the Comparison Tests described later on. This compound can be added to the flux in an extremely small quantity. An addition corresponding to a hydrochloride content of only 0.8 % is sufficient to give a spread of 396 mm² in the Comparison Test described hereinafter. Hitherto, it had not been considered possible for an addition of activator as small as this to have such an effect with all the other requirements that a flux has to meet being fully satisfied. When the above compound is used, the aforementioned hydrochloride content of the activator in the flux of 0.8 % is actually obtained by adding this compound to the flux in a quantity of only 2.6 % by weight. An addition as small as this had never been considered possible in the past.

The major advantage of the small addition is that inter alia the flux is not hygroscopic. This in turn has the advantage that the danger of corrosion is greatly reduced.

Another advantage of the flux according to the invention is that, during soldering, the flux retains the odour of pure rosin with hardly any change. Accordingly, it does not suffer from the unpleasant fish-like smell characteristic of fluxes containing simple aliphatic amine salts.

Further examples of readily accessible activators according to the invention include N-(2-chloroethyl)-N,N-diethyl ammonium chloride, N-(2-chloroethyl)-N,N-dimethyl ammonium chloride and N-(2-chloroethyl)-diisopropyl ammonium chloride, all of which are standard commercial products.

The activators used in accordance with the invention are completely soluble in the rosin which is normally used as resin for fluxes, thus guaranteeing homogeneous distribution of the flux components. This is particularly surprising in the case of 2-chloroethylamine hydrochloride which carries 2 hydrogen atoms on the nitrogen atom and the 2-chloroethyl group as its sole substituent.

In bit soldering, a rapid, easy flow is obtained without any sputtering where the flux is used as a flux filling in tubular soft solders.

Various hydrohalic acids can be used for salt formation with the amines used as activators, depending upon the purpose for which the flux according to the invention is to be used. Hydrochlorides are generally preferred for reasons of cost. Basically, however, it is also possible to use hydrofluorides and hydrobromides.

In addition to rosin, the flux according to the invention can also contain as its resin component other natural or synthetic resins, as known from the prior art. In this connection, reference is made for example to the Patent Specifications quoted earlier on.

The results of soldering tests carried out with conventional fluxes and with fluxes according to the invention, are set out in the following Table.

The tests were carried out as follows:

Ms 63 brass plates measuring 0.5 mm × 40 mm × 40 mm were degreased, pickled in a mixture of 73 % of sulphuric acid (D=1.82 g/ml), 26 % of nitric acid (D=1.33 g/ml), 0.5 % of sodium chloride and 0.5 % of gloss black until a uniform, matt gloss was obtained, rinsed with water and ethanol and dried. 500 mg of the tubular soft solder (60 % tin content), diameter 1.5 mm, rolled into a tight coil, were applied to each of these plates.

The plates carrying these coils were placed for 5 seconds on a soldering tin bath (content at least 4 kg, bath at least 25 mm deep) with a temperature of 300°C.

After cooling, the surface covered by the spread solder was measured by a planimeter. The results of these tests are set out in the following Table, the quantity of activator present in the flux being expressed as the hydrochloride content, based on the flux.

TABLE

| Activator | Activator content of the flux, expressed as % by weight HCl | Area covered (average from 10 measurements) |
| --- | --- | --- |
| 2-chloroethylamine hydrochloride | 0.8 | 396 mm² |
| N-(2-chloroethyl)-N,N-diethyl ammonium chloride | 0.8 | 335 mm² |
| N-(2-chloroethyl)-N,N-dimethyl ammonium chloride | 0.8 | 346 mm² |
| triethylamine hydrochloride | 1.5 | 282 mm² |
| morpholine hydrochloride | 1.5 | 300 mm² |
| Fluitin, a product of Messrs. Kuppers Metallwerk GmbH, Bonn, Germany | 1.5 | 330 mm² |
| pyridinol-2-hydrochloride | 1.1 | 310 mm² |
| 1-phenyl-2,3-dimethyl pyrazolone-5-hydrochloride | 1.0 | 247 mm² |

What is claimed is:

1. A flux for soft solders with a resin-based carrier substance and an activating agent of hydrochloride, hydrofluoride or hydrobromide acid salts of organic amines corresponding to the formula

in which $R_1$ represents an aliphatic hydrocarbon radical with 1 to 6 carbon atoms containing at least one halogen atom, and $R_2$ and $R_3$ represent hydrogen or aliphatic hydrocarbon radicals with 1 to 6 carbon atoms or having the same meaning as $R_1$, the number of halogen atoms on said aliphatic hydrocarbon radical being as low as possible and not more than will provide an activating agent which is compatible with said resin-based carrier and a flux which is non-hygroscopic and which produces a spread of greater than about 300 mm² with 500 mg flux at 300°C. with the addition of an amount of said activator sufficient to provide only about 0.8% by weight of the hydrohalide.

2. A flux according to claim 1, in which the aliphatic groups contain 1 to 3 carbon atoms.

3. A flux according to claim 1, in which the aliphatic groups are saturated.

4. A flux according to claim 1 in which the organic amine corresponds to the formula in which $R_2$ and $R_3$ represent hydrogen atoms.

5. A flux according to claim 1, in which the substituent $R_1$ contains one halogen atom.

6. A flux according to claim 5, in which the substituent $R_1$ contains a chlorine atom.

7. A flux according to claim 1, in which the acid salt is the hydrochloride of the organic amine.

8. A flux according to claim 1, in which the activator is 2-chloroethylamine hydrochloride.

9. A flux according to claim 11, in which the activator is N-2-chloroethyl-N,N-dimethylamine hydrochloride.

10. A flux according to claim 11, in which the activator is N-2-chloroethyl-N,N-diethylamine hydrochloride.

11. A flux according to claim 1, wherein $R_2$ and $R_3$ are aliphatic hydrocarbon radicals having from 1 to 6 carbon atoms.

12. A flux according to claim 1, wherein said aliphatic hydrocarbon radicals are linear.

13. A flux according to claim 1, wherein said activating agent is present in said flux in an amount sufficient to provide maximum spread of said flux upon soldering but below that amount which adversely effects the compatability of the activating agent with said resin-based carrier, the corrosiveness of the flux and the hygroscopicity of the flux.

14. A flux according to claim 13, wherein said activating agent is present in an amount sufficient to provide a content of hydrochloride, hydrofluoride or hydrobromide of about 0.8% by weight.

* * * * *